US012783419B2

(12) United States Patent
Harris et al.

(10) Patent No.: US 12,783,419 B2
(45) Date of Patent: Nov. 3, 2026

(54) CACHE ARRANGEMENTS IN DATA PROCESSING SYSTEMS

(71) Applicant: Arm Limited, Cambridge (GB)

(72) Inventors: Peter William Harris, Cambridge (GB); Edvard Fielding, Trondheim (NO)

(73) Assignee: Arm Limited, Cambridge (GB)

( * ) Notice: Subject to any disclaimer, the term of this patent is extended or adjusted under 35 U.S.C. 154(b) by 41 days.

(21) Appl. No.: 18/692,882

(22) PCT Filed: Nov. 25, 2022

(86) PCT No.: PCT/GB2022/052999
§ 371 (c)(1),
(2) Date: Mar. 18, 2024

(87) PCT Pub. No.: WO2023/094829
PCT Pub. Date: Jun. 1, 2023

(65) Prior Publication Data
US 2024/0378155 A1 Nov. 14, 2024

(30) Foreign Application Priority Data
Nov. 25, 2021 (GB) ..................................... 2117035

(51) Int. Cl.
*G06F 12/08* (2016.01)
*G06F 12/0868* (2016.01)
(Continued)

(52) U.S. Cl.
CPC ...... *G06F 12/0871* (2013.01); *G06F 12/0868* (2013.01); *G06T 1/60* (2013.01); *G06F 2212/455* (2013.01)

(58) Field of Classification Search
CPC ............ G06F 12/0871; G06F 12/0868; G06F 2212/455; G06F 2212/1024;
(Continued)

(56) References Cited

U.S. PATENT DOCUMENTS 9,058,637 B2 6/2015 Nystad et al.
2015/0379684 A1* 12/2015 Ramani .................. G06T 11/40 345/531
2019/0096027 A1* 3/2019 Fielding ............. G06F 12/0811

OTHER PUBLICATIONS

International Search Report and Written Opinion for International Application No. PCT/EP2022055357, dated Jun. 29, 2022.
(Continued)

*Primary Examiner* — Hua J Song
(74) *Attorney, Agent, or Firm* — Pearl Cohen LLP

(57) ABSTRACT

Disclosed is a data processing system comprising a data processor and a cache that is operable to transfer data from memory to the data processor. The data processor is operable to use data of a type that when transferred to the cache can comprise multiple component values. The data processor is however operable to store within a cache line of the cache a subset of less than all of the component values for a multicomponent data element. The cache is configured to further store in association with each cache line an indication of which data element component values are stored in the cache line so that cache lookups can be performed using the indications of which data element component values are stored in which cache lines.

20 Claims, 7 Drawing Sheets

(51) Int. Cl.
*G06F 12/0871* (2016.01)
*G06T 1/60* (2006.01)

(58) Field of Classification Search
CPC . G06F 2212/601; G06F 12/0875; G06T 1/60; G06T 15/04
USPC .......................................................... 711/113
See application file for complete search history.

(56) References Cited

OTHER PUBLICATIONS

Phitchaya Mangpo Phothilimthana et al. "Swizzle Inventor: Data Movement Synthesis for GPU Kernels," New Yorkn, USA, Apr. 4, 2019, p. 65-78.
Michael Bader et al. "Fast GPGPU Data Rearrangement Kernels using CUDA," Nov. 15, 2010, p. 1-5.

* cited by examiner

Option 1: Surface 1 is stored with different sets of lanes active at same coordinate depending on sampler state

| | | | | | | | | | | | | | | | | | | |
|---|---|---|---|---|---|---|---|---|---|---|---|---|---|---|---|---|---|---|
| 0 | 0,0 | RGBA | R | G | B | A | R | G | B | A | R | G | B | A | R | G | B | A |
| 0 | 4,0 | RGBA | R | G | B | A | R | G | B | A | R | G | B | A | R | G | B | A |
| 1 | 0,0 | RG | R | G | R | G | R | G | R | G | R | G | R | G | R | G | R | G |
| 1 | 0,0 | RA | R | A | R | A | R | A | R | A | R | A | R | A | R | A | R | A |

FIG. 7A

Option 2: Initial state – surface 1 is stored with RG samplers

| | | | | | | | | | | | | | | | | | | |
|---|---|---|---|---|---|---|---|---|---|---|---|---|---|---|---|---|---|---|
| 0 | 0,0 | RGBA | R | G | B | A | R | G | B | A | R | G | B | A | R | G | B | A |
| 0 | 4,0 | RGBA | R | G | B | A | R | G | B | A | R | G | B | A | R | G | B | A |
| 1 | 0,0 | RG | R | G | R | G | R | G | R | G | R | G | R | G | R | G | R | G |
| 1 | 8,0 | RG | R | G | R | G | R | G | R | G | R | G | R | G | R | G | R | G |

User requests a sample from surface 1 with an RA sampler
New lines are allocated with the merged set of requested/stored samplers, using all
4 component in preference to storing 3

| | | | | | | | | | | | | | | | | | | |
|---|---|---|---|---|---|---|---|---|---|---|---|---|---|---|---|---|---|---|
| 0 | 0,0 | RGBA | R | G | B | A | R | G | B | A | R | G | B | A | R | G | B | A |
| 0 | 4,0 | RGBA | R | G | B | A | R | G | B | A | R | G | B | A | R | G | B | A |
| 1 | 0,0 | RG | R | G | R | G | R | G | R | G | R | G | R | G | R | G | R | G |
| 1 | 0,0 | RGBA | R | G | B | A | R | G | B | A | R | G | B | A | R | G | B | A |

FIG. 7B

CACHE ARRANGEMENTS IN DATA PROCESSING SYSTEMS

BACKGROUND

The technology described herein relates to data processing systems such as graphics processing systems, and in particular to cache operations for storing multicomponent data (e.g. texture data) for use in such processing systems.

There are various situations of data processing where multicomponent data is required to be processed.

For instance, it is common in computer graphics systems to generate colours for sampling positions in an image to be displayed by applying so-called textures or texture data to the surfaces to be drawn. For example, surface detail on objects may be generated by applying a predefined "texture" to a set of polygons representing the object, to give the rendered image of the object the appearance of the "texture". Such textures are typically applied by storing an array of texture elements or "texels", each representing given texture data (such as colour, luminance, and/or light/shadow, etc. values), and then mapping the texels onto the corresponding elements, such as (and, indeed, typically) a set of sampling positions, for the image to be displayed. The stored arrays of texture elements (data) are typically referred to as "texture maps".

Such arrangements can provide high image quality, but have a number of drawbacks. In particular, the storage of the texture data and accessing it in use can place, e.g., high storage and bandwidth requirements on a graphics processing device (or conversely lead to a loss in performance when such requirements are not met). This may be particularly significant for mobile and handheld devices that perform graphics processing, as such devices are inherently limited in their storage, bandwidth and power resources and capabilities.

A cache system may therefore be used to assist with storing at least some of the texture data more locally to the graphics processor, to thereby speed up the retrieval of the texture data when graphics processing (texturing) operations using the texture data are being performed. For instance, in this way it is possible to reduce the need to fetch texture data from slower data stores, such as an external (e.g. main) memory of the graphics processing system. This can therefore improve the performance of the graphics processing (texturing) operations.

The Applicants however believe that there remains scope for improvements to cache operations for storing texture data for use in graphics processing systems.

More generally, the Applicants believe there remains scope for improvements to cache operations for storing data of any suitable multicomponent data format for use in data processing systems, as desired.

BRIEF DESCRIPTION OF THE DRAWINGS

Embodiments of the technology described herein will now be described by way of example only and with reference to the accompanying drawings, in which:

FIG. 7 shows schematically the operation of the texel cache according to the technology described herein.

Like numerals are used for like features in the drawings (where appropriate).

DETAILED DESCRIPTION

Figure 1:
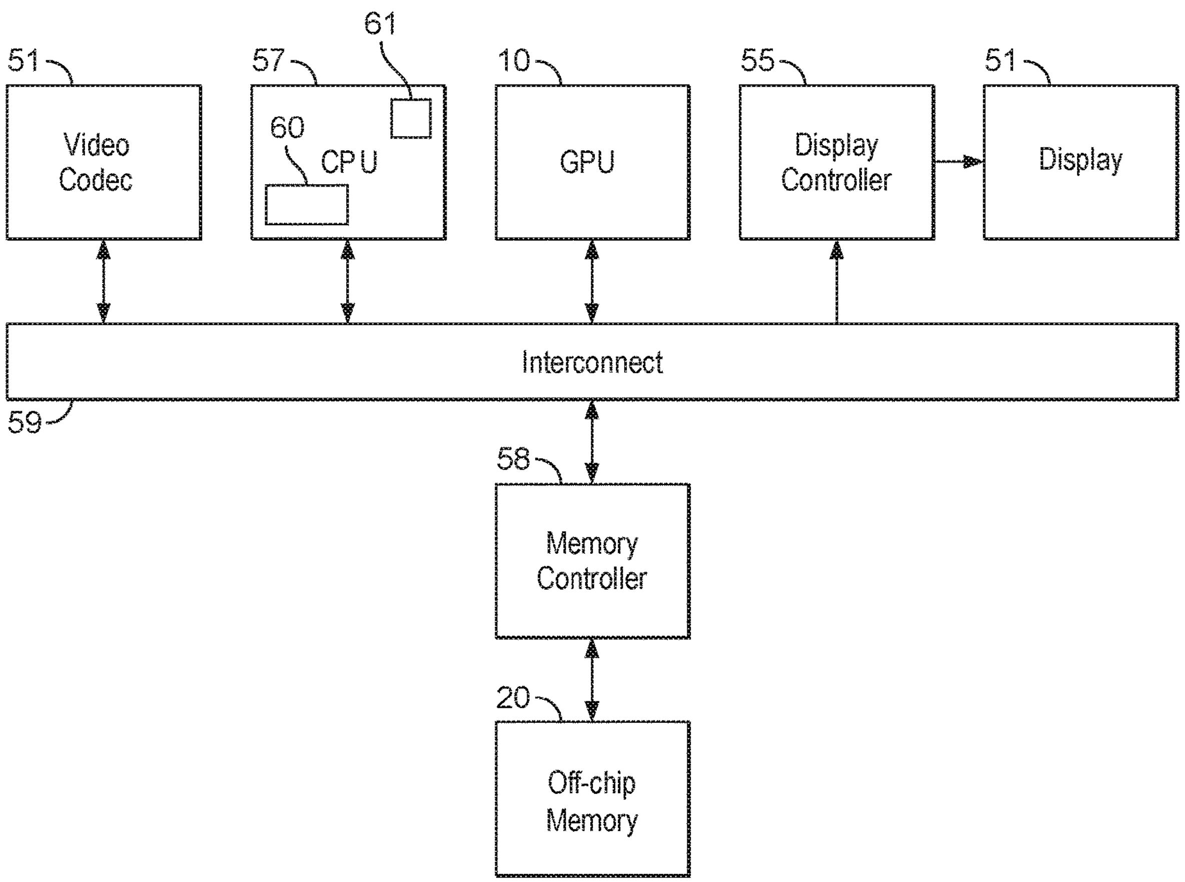
FIG. 1 shows an exemplary data processing system in which the technology described herein may be implemented.

A first embodiment of the technology described herein comprises a data processing system comprising:

a memory system;

a data processor operable to perform data processing operations, wherein when performing at least some data processing operations the data processor is configured to use data of a first type; and a cache operable to transfer data of the first type that is stored in the memory to the processor for use by the processor when performing a processing operation, wherein data of the first type that is to be transferred from the memory to the cache can comprise multicomponent data, each multicomponent data element comprising a set of plural, respective component values for the data element, and the data processing system is operable to store within a cache line of the cache a subset of less than all of the component values for a multicomponent data element, the cache being configured to further store in association with each cache line an indication of which data element component values are stored in the cache line;

the data processing system being configured such that:

when the data processor requires component values for a set of one or more components of a multicomponent data element of the first type, the processor is configured to issue a lookup request for the set of one or more component values for the data element to the cache, the lookup request using the stored indications of which data element component values are stored in which cache lines to determine whether the requested set of one or more component values for the data element are present in the cache:

wherein when it is determined using the stored indications that the requested set of one or more component values for the data element is present in the cache, the requested set of one or more component values are provided to the data processor from the cache.

A second embodiment of the technology described herein comprises a method of operating a data processing system that comprises:

a memory system;

a data processor operable to perform processing operations, wherein when performing at least some data processing operations the processor is configured to use data of a first type; and a cache operable to transfer data of the first type that is stored in the memory to the data processor for use by the data processor when performing a data processing operation that uses data of the first type, wherein data of the first type that is to be transferred from the memory to the cache can comprise multicomponent data, each multicomponent data element comprising a set of plural, respective component values for the data element, and the data processing system is operable to store within a cache line of the cache a subset of less than all of the component values for a multicomponent data element, the cache being configured to further store in association with each cache line an indication of which data element component values are stored in the cache line;

the method comprising, when the data processor requires component values for a set of one or more components of a data element of the first type:

the data processor issuing a lookup request for the set of one or more component values for the data element to the cache, using the stored indications of which data element component values are stored in which cache lines to determine whether the requested set of one or more component values for the data element are present in the cache; and when it is determined using the stored indications that the requested set of one or more component values for the data element is present in the cache, providing the requested set of one or more component values to the data processor from the cache.

It will be appreciated here that the data processing system may comprise any suitable and desired data processing system. Correspondingly, the data of the first type may be any suitable and desired multicomponent data. That is, whilst in various embodiments that will be described below the data of the first type may comprise multicomponent image data, e.g., and in an embodiment, texture data that is to be used for graphics processor texturing operations, in general, the data of the first type may comprise various suitable image or non-image data. Thus, whilst various embodiments will now be described for ease of explanation in the context of multicomponent texture data, it will be appreciated that the technology described herein broadly applies to any suitable and desired type of data.

Thus, according to a particular embodiment, there is provided a graphics processing system comprising:

a memory system;

a graphics processor operable to generate a render output, wherein when generating a render output the graphics processor is configured to perform texturing operations that apply texture data to respective sampling positions within the render output; and a "texture" cache operable to transfer texture data stored in the memory to the graphics processor for use by the graphics processor when generating a render output, wherein texture data that is to be transferred from the memory to the texture cache can comprise multicomponent texture data, each multicomponent texture data element comprising a set of plural, respective component values for the texture data element, and the graphics processing system is operable to store within a cache line of the texture cache a subset of less than all of the component values for a multicomponent texture data element, the texture cache being configured to further store in association with each cache line an indication of which texture data element component values are stored in the cache line;

the graphics processing system being configured such that:

when the graphics processor requires component values for a set of one or more components of a multicomponent texture data element, the graphics processor is configured to issue a lookup request for the set of one or more component values for the texture data element to the texture cache, the lookup request using the stored indications of which texture data element component values are stored in which cache lines to determine whether the requested set of one or more component values for the texture data element are present in the texture cache:

wherein when it is determined using the stored indications that the requested set of one or more component values for the texture data element is present in the texture cache (a texture cache "hit"), the requested set of one or more component values are provided to the graphics processor from the texture cache.

According to a further embodiment, there is provided a method of operating a graphics processing system that comprises:

a memory system;

a graphics processor operable to generate a render output, wherein when generating a render output the graphics processor is configured to perform texturing operations that apply texture data to respective sampling positions within the render output; and a "texture" cache operable to transfer texture data stored in the memory to the graphics processor for use by the graphics processor when generating a render output, wherein texture data that is to be transferred from the memory to the texture cache can comprise multicomponent texture data, each multicomponent texture data element comprising a set of plural, respective component values for the texture data element, and the graphics processing system is operable to store within a cache line of the texture cache a subset of less than all of the component values for a multicomponent texture data element, the texture cache being configured to further store in association with each cache line an indication of which texture data element component values are stored in the cache line;

the method comprising, when the graphics processor requires component values for a set of one or more components of a texture data element:

the graphics processor issuing a lookup request for the set of one or more component values for the texture data element to the texture cache, using the stored indications of which texture data element component values are stored in which cache lines to determine whether the requested set of one or more component values for the texture data element are present in the texture cache; and when it is determined using the stored indications that the requested set of one or more component values for the texture data element is present in the texture cache (a texture cache "hit"), providing the requested set of one or more component values to the graphics processor from the texture cache.

The technology described herein in these embodiments relates to graphics processor texturing operations, and in particular to more efficient cache arrangements for handling requests for texture data for use by a graphics processor.

For instance, when generating a render output (e.g. an image), a graphics processor may perform texturing operations for sampling positions in the render output to determine the appearance of the render output. This typically (and in an embodiment) involves applying a set of texture data defining the texture surface (e.g. in terms of its colour components, but also other properties of the surface) to respective sampling positions within the render output to determine the appearance (e.g. colour) that the sampling positions should have in the final render output.

The texture data is stored in a memory system, which may, e.g., and in an embodiment does, comprise an external, e.g. main, memory. When performing a texturing operation, the graphics processor can thus (and does) request the relevant texture data for the texturing operation from memory, with the requested texture data then being returned to the graphics processor accordingly.

In the technology described herein this transfer of data is facilitated by the use of a "texture" cache that is operable to transfer texture data stored in the memory to the graphics processor for use by the graphics processor when generating a render output. That is, rather than the texture data being transferred directly from the memory system to the graphics processor, the texture data is transferred via the texture cache (which may itself be part of a larger cache system that is used for transferring such data between the graphics processor and memory).

Thus, as will be explained further below, the graphics processor, when performing a texturing operation, may issue a lookup request for the required texture data to the texture cache, with the texture cache then processing the lookup request accordingly.

In order to facilitate storing the texture data in the memory system, the texture data is in an embodiment stored in the memory system in a compressed format. For instance, the texture data may be, and in an embodiment is, stored in memory using Arm's adaptive scalable texture compression (ASTC) technique, e.g. as described in U.S. Pat. No. 9,058,637 (Arm Limited). However, various other suitable compression techniques exist for compressing texture data, including but not limited to Ericsson Texture Compression (ETC), that may additionally/alternatively be used according to embodiments of the technology described herein.

Where the texture data is stored in memory in a compressed format, this means that when a graphics processor is performing a texturing operation, in response to the graphics processor requesting texture data from memory, the texture data must then be decompressed into an uncompressed format in which it can be used by the graphics processor. This decompression could be done by the graphics processor shader core but this is not normally efficient. In embodiments therefore, a dedicated hardware block, the texture decompressor, is provided between the memory system and the texture cache. Texture data is in an embodiment then in the texture cache in an uncompressed form, i.e. the form in which it will be used by the graphics processor. This can be beneficial in allowing blocks of data to be re-used multiple times, e.g. without repeated decompression.

Thus, the texture data is in an embodiment decompressed between the memory and texture cache. In an embodiment, this is done using a lower level cache of the cache system, as will be explained further below, but various arrangements would be possible.

Texture data typically represents the appearance of a surface, in particular including the colour that the surface should have. Texture data may therefore typically be stored in memory (from where it can be transferred to the texture cache, as required) in a multicomponent (e.g. multicolour) pixel format, such as an RGB (A) colour format. In that case, each texture data element (texel) may comprise a respective set of multiple component values (e.g. R, G, B, A channel values) that define the properties (e.g. colour) of the texture in question. The texture data that is stored in memory, and that is to be transferred into the texture cache for use by the graphics processor, i.e. for a texturing operation, may thus (and in an embodiment does) comprise multicomponent texture data.

Where the texture data is decompressed as it is transferred from memory to the texture cache, as is the case in embodiments, it is also the case that the (compressed) texture data stored in memory may in fact comprise fewer components, but the decompression scheme nonetheless always decompresses the texture data to a multicomponent format.

For instance, this may be the case for ASTC, which is able to flexibly compress data having one, two, three or four components, but always decompresses to a four-component output. This means that even if the texture data as it is stored in the memory contains fewer components (e.g. only a single component), when the texture data element is decompressed for transfer to the texture cache, the initial result of the decompression is a multicomponent value (with some of the components in the uncompressed format essentially being redundant).

Thus, in embodiments, the texture data is stored in memory in a compressed format, and stored in the texture cache in an uncompressed format, with the texture data being decompressed when it is to be transferred from into the texture cache. In that case, when texture data in the compressed format is decompressed for storage in the texture cache, at least some of, and in embodiments all of, the decompressed texture data comprises multiple components (either because the texture data element is in fact multicomponent texture data, or as a result of the compression scheme always decompressing to a fixed multicomponent format).

The technology described herein is particularly concerned with such situations where (at least some of) the texture data that it is to be transferred into the texture cache during a texturing operation comprises "multicomponent" texture data, at least in the (decompressed) format in which it would be stored in the texture cache, i.e. such that each texture data element (texel) comprises a set of plural component values.

In particular, the technology described herein recognises that storing such multicomponent texture data in the texture cache can in some cases lead to an inefficient cache utilisation. The technology described herein further recognises that it may be beneficial to be able to store multicomponent texture data in the texture cache in part, using a reduced, or narrower, texel format, such that less than all of the texture data element's components are stored in the texture cache, and provides an efficient mechanism for doing this.

For instance, texture data is normally, e.g. in some more conventional arrangements, stored in the texture cache in a fixed (static) pixel format, e.g., depending on its compression format. That is, all texture data that is stored in memory in one format is then stored in the texture cache in a common format. This means that where the texture data comprises multicomponent data (or where the decompression scheme produces multicomponent data), the texture data is always stored in the texture cache in full, in its multicomponent format.

The technology described herein recognises however that it is often the case that a given (e.g. the current) texturing operation to be performed may require only a subset of less than all of the texture component values (e.g. only the RA channels for RGBA format texture data). In that case, in some more conventional arrangements, the texturing operation would trigger the texture data to be fetched into the texture cache, and the uncompressed texture data would then simply be stored in full in the texture cache (including all of its components). However, depending on the texturing operation in question, some of the components may not be needed at this point.

Likewise, when the multicomponent format is a result of the decompression scheme, but the original (compressed) texture data in fact has fewer components, the additional "component" values in that case are essentially redundant, and merely an artefact of the decompression process (and so are not needed). Again, in arrangements that are more conventional this data may however be stored in full, as there is no mechanism to do otherwise.

The technology described herein thus recognises that when texture data in a multicomponent format is to be stored in the texture cache, there may be instances where less than all components are presently needed by the graphics processor in order to perform its current texturing operation(s), but wherein more conventional texture caching arrangements would nonetheless store all of the components into the texture cache, which may therefore be an inefficient use of the texture cache resource.

To address this, the technology described herein accordingly provides an improved texture cache arrangement that is operable to transfer such texture data from memory upon request by the graphics processor, but that allows a subset of less than all of the components of a multicomponent texture data element to be stored within a cache line in the texture cache. This means that when less than all of the components are needed, rather than storing the texture data element in the texture cache in full, with all of its components, the technology described herein can use a suitable reduced component format for storing the texture data in the texture cache. The technology described herein thus in an embodiment avoids storing at least some of the not needed components. This in turn avoids using cache resource (area) to store data that is not presently required.

In this way, by allowing multicomponent texture data to be stored only in part in the texture cache, the technology described herein may thus improve the overall cache utilisation.

That is, rather than always storing texture data in the texture cache in the same multicomponent format, e.g. based solely on the format in which it is stored in memory, the technology described herein allows the graphics processing system to select the format in which a texture data element is stored in the texture cache based on the components that are actually needed for the current texturing operations, i.e. such that less than all of the component values can be (and are) stored in the texture cache when it is appropriate to do so.

Thus, when a graphics processor texturing operation triggers the fetching of a (multicomponent) texture data element from memory, rather than simply fetching and then storing the texture data element in full in the texture cache (with all of its components), the technology described herein allows the texture cache to store the texture data element in a different texel format, e.g. a narrower texel format which includes less than all of the texture data element components.

For example, the graphics processor, when performing a texturing operation, may trigger the fetching of a texture data element from memory into the texture cache. In that case, the texture data element may be initially decompressed from its memory format to a first, multicomponent format (e.g. an RGBA colour format). However, the texturing operation that triggered the fetching of the texture data element may only require some (less than all) of the component values (e.g. only the RA channels).

According to the technology described herein, therefore, rather than simply storing the texture data element in the texture cache in full, in the first, multicomponent format, the texture cache can select an appropriate reduced format (e.g. an RA pixel format) for storing the required component values in the texture cache. The other not needed components can then be, and in an embodiment are, discarded at this point, without being stored in the texture cache.

The control (selection) of which format (i.e. which components) are stored in the texture cache is in an embodiment performed by the graphics processor when issuing a request for the data. That is, the graphics processor is in an embodiment configured to issue cache lookup requests for specific sets (or subsets) of component values for a texture data element (rather than for the texture data element as a whole), and the selection of which components are stored in the texture cache (which texel data format is used) is then made based on which component values have been requested.

This can be managed in various ways, as desired. For instance, in an embodiment, the ordering of the texture data that is to be transferred to the texture cache is performed using a "swizzle" (or sampling/re-ordering) mask. The swizzle (sampling/re-ordering) mask is used by the graphics processor to read in the texture data element components that are required for a texturing operation, and order them into respective (e.g.) shader lanes for processing. The swizzle mask parameters can thus be set appropriately so that the component values that are transferred to the respective shader lanes for processing come from the desired respective data channels (e.g. so that the R component is processed correctly, etc.).

In embodiments, the graphics processor uses the swizzle mask to indicate which component values should be transferred into the texture cache, such that a reduced set of component values can be stored in the texture cache, when it is appropriate to do so. In particular, the swizzle (sampling/re-ordering) mask indicates which components are required for the current texturing operation. This information (the sampling/re-ordering mask) is typically already provided by the graphics processor in order to perform the appropriate texturing operation. In an embodiment, this information is then included into the cache lookup request, and thereby propagated to the texture cache as part of the cache lookup request.

Correspondingly, when a cache lookup request is performed, the cache lookup request is performed using the information as to which component values are of interest. This then allows the texture cache to determine which sets of components should be stored. That is, by re-mapping the sampling/re-ordering swizzle mask onto the physical lane swizzle mask, this sampling information can then be provided to the texture cache format selection logic, as part of the cache lookup request, and used by this logic accordingly to select the format in which a texture data element is stored in the texture cache.

An aspect of the technology described herein in its embodiments is thus the recognition that it is possible for the graphics processor to determine (e.g. during run-time) which component values are actually required to be sampled for a given texturing operation and to then issue cache lookup requests accordingly for sets of one or more components (rather than just for the 'full' texture data element).

In this case, the selection of which format to store texture data in the texture cache (i.e. which components to store) is made in direct dependence on the components that have been requested by the graphics processor. Thus, the graphics processor may issue a lookup request for a specific subset of component values of a texture data element, and in the case that the requested component values are not already present in the texture cache (there is a cache "miss"), a set of component values for the texture data element including at least the requested components can then be stored in the texture cache appropriately, in an appropriate format.

That is, in embodiments, the graphics processing system is configured such that the graphics processor, when performing a texturing operation, is operable to issue a lookup request for component values for a subset of less than all components of a multicomponent texture data, and the graphics processing system is operable to store within a cache line of the texture cache, in dependence on which texture data element components have been requested by the graphics processor, a subset of less than all of the component values for a multicomponent texture data element. Various arrangements would be possible in this regard, as will be explained further below.

However, other arrangements would be possible. For example, it would also be possible to pre-compile/execute a program that writes out (only) a list of what components are used for which texturing operations, and for this information (list) to then be used as input state for controlling the operation of the texture cache format selection in the manner of the technology described herein. In this case, the selection of which components are to be stored in the texture cache is still generally based on the components that are required by the graphics processor, but may be determined in advance, rather than directly determined during run-time.

Thus, when a texture data element is fetched from memory into the texture cache, the texture cache controller (a format selection circuit) is provided with information as to which texture data element components are presently required by the graphics processor, and is configured to then select a format in which the texture data element is stored in the texture cache accordingly based on the texture data element components that are presently required by the graphics processor. In this way, where the texture data element comprises multiple components, but less than all of the components are presently required, a reduced set of texture data element components can then be stored in the texture cache, as desired.

To allow the texture data to be effectively cached in this way it therefore needs to be additionally tracked which specific (sets of) components are stored in which cache lines.

The technology described herein therefore also stores, in association with each cache line, an indication of which of the components are stored in the cache line. A cache lookup request in the technology described herein for a set of components therefore in an embodiment not only looks up the texture data as a whole (e.g. in the usual way) but also checks against this indication whether or not the required (individual) texture data element components are present in the texture cache.

Subsequent cache lookup requests can then be performed accordingly for the (individual) sets of texture data element components.

This indication is in an embodiment provided as part of a cache line tag, as will be explained further below. The indication (tag) may directly or indirectly indicate which texture data elements are stored in its associated cache line. For instance, in embodiments, the (re-mapped) physical swizzle may be stored directly in the cache line tag. Various arrangements would be possible in this regard.

Thus, by storing in association with a cache line an indication, e.g., and in an embodiment, as part of the cache line tag, as to which specific components are stored in the cache line, it is possible for the texture cache to process cache lookup requests for sets (or subsets) of one or more components of a texture data element (rather than just for the 'full' texture data element).

The cache operations can then otherwise essentially proceed as normal but with cache lookup requests being performed in respect of sets of components for a particular texture data element, rather than for the (multicomponent) texture data element as a whole.

For instance, if the requested set of components for a particular texture data element is already present in the cache (there is a texture cache "hit"), the requested data can then be provided from the texture cache to the graphics processor, e.g. in the normal way. On the other hand, if a requested set of components for a particular texture data element is not present in the cache (there is a texture cache "miss"), the texture data element can be fetched into the texture cache from memory appropriately.

Thus, when it is determined using the stored indications that the requested set of one or more component values for the texture data element is present in the texture cache (a texture cache "hit"), the requested set of one or more component values are provided to the graphics processor from the texture cache.

On the other hand, when it is determined using the stored indications that the requested set of one or more component values for the texture data element is not present in the texture cache (a texture cache "miss"), one or more component values for the texture data element are in an embodiment read into the texture cache from memory so that the lookup request can be completed.

As mentioned above, in the event of a texture cache miss, rather than simply then storing all of the components of the texture data element into the texture cache, in full, as might otherwise normally be done, a subset of less than all of the components can be stored in the texture cache, in dependence of which components are presently required by the graphics processor, with some of the other not needed components in an embodiment being discarded (not stored in the texture cache).

There are various possibilities in this regard.

For instance, it may be the case, that when the graphics processor issues a request for a first set of texture data element component values, the texture cache does not contain any component values for the texture data element that is the subject of the request.

In that case, rather than simply storing the texture data element in full in the texture cache, the texture cache is able to select a different format for the texture data element, in particular such that only a reduced set of components (including at least the requested set of texture data element component values) is stored in the texture cache, with the other not needed components in an embodiment being discarded (not stored in the texture cache) (where it is appropriate to do that).

Thus, the one or more components that are stored in response to a texture cache miss for a set of component values for a texture data element may be a set of less than all of the component values (including at least the requested component values). In some cases, the one or more components that are stored in response to a texture cache miss for a set of component values for a texture data element are only the requested component values.

It could also be the case that the texture cache already contains some but not all of the component values for the texture data element that is the subject of the request. In that case, at least some of the requested component values might already be present in the cache, but other component values may still need to be fetched from memory. The texture data element can thus be (re-)fetched accordingly from memory with one or more component values required to complete the cache lookup request then being stored (added) into the texture cache.

In this case, there may then be multiple cache lines storing different sets of component values for the same texture data element.

For instance, if a first cache lookup request relates to a texturing operation requiring only a first set of components (e.g. only the RA channels) for a given texture data element, there may then be a subsequent, second or further cache lookup request(s) that requires other components (e.g. the GB components) for the same texture data element.

In that case, the texture cache could simply be arranged to store the data resulting from the different requests (e.g. the different components of the same texture data element) in different cache lines, with some of that data (components) potentially being copied and stored multiple times.

For instance, if a first set of components for a texture data element are present in the cache (e.g. the RA components), but a subsequent texturing operation requires a different set of components for the same texture data element (e.g. the GB components), the subsequent lookup request will miss, and the texture data element will therefore need to processed again in order to fetch in the additional component values from memory.

Thus, it will be appreciated that storing only some of the components may in some instances result in a higher number of cache misses (e.g. compared to storing the texture data elements in full), with the result that the same texture data element may need to be fetched, and in embodiments decompressed, etc., multiple times.

To avoid unnecessary duplication, the texture cache may therefore track, e.g. using a suitable scoreboard, which texture data elements are being requested, and use this information when determining which texel data format to use.

For instance, the one or more components that are fetched into the texture cache for storage could be the one or more components that are missing in the texture cache (and only those one or more components).

However, in some cases, it may be more efficient to simply fetch in all of the components. For example, this may be the case where there are multiple requests relating to the same texture data element, as even if the present operation does not require the full set of components, in most cases the full set of components will eventually be needed, and so it may be better to store the texture data element in full at this point.

This may also be the case where the present operation requires, or would result in storing, (e.g.) three out of four components for a texture data element. For instance, cache line operations typically use powers of two. This means that there may be no benefit in storing only three out of four components for a texture data element, and it may therefore be better to simply fetch the texture data element in full.

Various arrangements would be possible in this regard.

For example, where some components are stored in one cache line, but other components are to be stored in another cache line, the texture cache may effectively merge the cache lines appropriately, with the effect that all of the components are then stored together in the merged cache line. This could be done in various ways. For instance, the texture cache controller may be operable to identify when data relating to the same texture data element is stored in multiple cache lines, and to then perform an appropriate merging operation. Alternatively, this operation can be performed in response to a lookup request from the graphics processor. For example, in an embodiment, when the texture cache (controller) receives a lookup request from the graphics processor for a set of components for a texture data element, the set of components indicated in the lookup request is then merged with any other ('active') sets of components that are already stored in the texture cache for the same texture data element, with the lookup then being performed on the merged request (such that a new cache line is then allocated for the merged set of component values). The cache lines storing the other sets of components that were already stored in the texture cache can then be evicted appropriately in favour of the merged cache lines. This approach can work well since it is likely that the graphics processor will eventually need all of the components in order to complete the overall graphics processing job.

In some embodiments, the selection of the format in which the texture data element is to be stored in the texture cache could be a free selection between all possible texel data formats that the graphics processor is able to handle (so that any combination of texture data components could in principle be stored in the texture cache).

In embodiments however the texture cache is constrained to select between a set of predefined texture formats. For instance, for RGBA multicomponent texture data, the texture cache may be operable to store this data either in full (RGBA), or according to a certain set of reduced component formats (e.g. according to RA, GA, BA formats), but with other combinations of components (e.g. RGB, RG, RB, GB, A) not available. In that case, if, for example, the R and G colour channels were both required, the texture data element would simply be stored in full (RGBA) format. However, if it is only the R and A channels that are needed, the texture data element can be stored in an RA format. This still therefore provides an improved cache utilisation. This can also facilitate simplifying the indications of which components are stored in which cache lines, as in that case it is only necessary to be able to signal one of the set of reduced component formats, rather than to signal all possible formats.

Various arrangements would be possible in this regard.

The technology described herein can therefore provide an overall improvement in cache utilisation, with relatively few changes to the overall caching mechanism or architecture.

The technology described herein may thus provide various benefits compared to other arrangements.

The memory (memory system) of the graphics processing system that the texture data is stored in (and that the cache (system) of the technology described herein interfaces with) may comprise any suitable and desired memory and memory system of the graphics processing system (e.g. of the overall data processing system that the graphics processing system is part of), such as, and in an embodiment, a main memory for the graphics processing system (e.g. where there is a separate memory system for the graphics processor), or a main memory of the data processing system that is shared with other elements, such as a host processor (CPU), of the data processing system. Other arrangements would, of course, be possible.

The cache (system) of the technology described herein may interface with and receive data from the (main) memory (and memory system) in any suitable and desired manner. It in an embodiment receives the data that is stored in the (main) memory via a cache of the (main) memory system.

In an embodiment, the cache (system) of the technology described herein interfaces and connects (in an embodiment directly) to the L2 cache of the main cache hierarchy of the memory system (e.g. of the graphics processing system or of the data processing system, as appropriate).

In embodiments, the cache system that connects to the (main) memory system of the graphics processing system and that is used to cache texture data for use by the graphics processing unit, rather than simply comprising a single cache, comprises two caches via which texture data can be transferred from the memory system to the graphics processing unit. In particular, there is a first cache that interfaces with the (main) memory system that stores the texture data, and then a second cache that interfaces between the first cache and the graphics processing unit that is to use the texture data.

Thus, the texture cache of the technology described herein in which texture data is stored in its uncompressed format in an embodiment corresponds to the second cache in such arrangements.

As mentioned above, the texture data is in an embodiment stored in memory in a compressed format. The texture data can be stored in the first cache (the cache that interfaces with the (main) memory) in any suitable and desired manner and format. In an embodiment, the texture data is stored in the first cache of the cache system in the form that it is stored in in the (main) memory. Thus the first cache in an embodiment stores a copy of the texture data (of the stored bits) that is (and as it is) stored in the (main) memory.

In that case, the cache (system) of the technology described herein in an embodiment also includes a data processing unit that is able to process data stored in the first cache that interfaces with the memory system before that data is transferred to the second cache that interfaces with the graphics processing unit (with the graphics processor). For instance, the data processing unit in an embodiment comprises a processing circuit for modifying (e.g. decompressing) the texture data from its form and arrangement as stored in the (main) memory of the graphics processing system before it is loaded into the (second) cache that interfaces with the graphics processing unit.

The cache(s) of the cache system of the technology described herein can be configured in any suitable and desired manner, and can, e.g., and in an embodiment, include any desired and suitable number of cache lines. They in an embodiment each comprise a plurality of cache lines.

Subject to the particular features for the texture cache (system) that will be discussed herein, the texture cache (system) can otherwise be configured and operate in any suitable and desired manner, such as, and in an embodiment, in dependence on and according to the normal cache mechanisms for the graphics (data) processing system in question. Thus they may, for example, and in an embodiment do, use normal cache operations and processes, such as least recently used (LRU) processes, to identify and free-up cache lines for use, etc., and to control the storing of texture data in the caches. Other arrangements would, of course, be possible.

The texture cache (i.e. that interfaces with, and provides texture data to, the graphics processor (processing unit) for use when generating a render output) can interface with the graphics processing unit in any suitable and desired manner.

In an embodiment, this texture cache interfaces with, and connects to, the texture mapper of the graphics processing pipeline of the graphics processor (processing unit) (which texture mapper is operable to receive (load) texture data from the texture cache and use that texture data to perform texturing operations).

Thus, in an embodiment, the graphics processing unit comprises a texture mapper (texture mapping circuitry) that is operable to use data stored in (and receive data from) the second cache, and to use that data when performing and to perform a texturing operation.

As mentioned above, the texture data is in an embodiment stored in the texture cache (the cache that interfaces with the graphics processing unit) in an uncompressed form (e.g., and in particular, such that where the texture data is stored in the memory in a compressed form, the texture data must be decompressed before it is stored in the texture cache). Where the texture cache is the second cache in a two-cache system, as mentioned above, the second cache is therefore in an embodiment bigger (has a greater capacity) than the first cache, since it needs to store uncompressed data. Various arrangements would however be possible.

The texture data is in an embodiment stored in the texture cache in one of a number of predefined texture formats, e.g., and in an embodiment, corresponding to particular arrangements and positions for the texture data components (channels) (e.g. RGB or YUV) being used. In an embodiment, there is a set of particular, in an embodiment selected, in an embodiment predefined, texture data formats that can be used in (by) the graphics processing unit, and the texture data is stored in the texture cache using one of those formats (but as explained above, the texture cache can select which format in which texture data is to be stored in from between these predefined formats, in particular such that a texture data element can either be stored in the texture cache in full, multicomponent format or in a reduced format in which less than all of its components are stored).

Where multiple components of a texture data element are to be stored within a single cache line in the texture cache, the multicomponent texture data is in an embodiment stored in the texture cache such that all the texture data components (e.g. colour channels) for a given texel (texture data element) in the texture are stored together as a group (e.g. in a contiguous sequence of bits). Thus, in an embodiment, the texture data is stored in the texture cache as respective "texels" (texture data elements) (irrespective of the form in which the data may be stored in the main memory system or in the first cache of the cache system of the technology described herein).

Thus, in the case of multicomponent RGB (or RGBA) texture data, each of the component values data values for a given texel (texture data element) will be stored together (in a contiguous sequence of bits) in the texture cache.

The data values for a given texel may be stored together as a group in the texture cache in any suitable and desired manner. In an embodiment, the data values are stored as a defined data unit, such as, and in an embodiment, as a respective data word, in the texture cache.

In the case where the data values for a particular texel do not fill the data unit (word), any unused bits in the data unit are in an embodiment padded with "dummy" values, and/or used to encode other properties, such as transparency.

It is a benefit and feature of the technology described herein however that the texture cache is operable to selectively store only some of the components (colour channels) for a given multicomponent (e.g. RGB or RGBA) texel (texture data element). In that case, again, when multiple (but potentially less than all) components are stored within a cache line, they are in an embodiment stored together.

However, it is also possible in the technology described herein for different components for a single texel (texture data element) to be stored in different cache lines, e.g. if they are fetched into the texture cache on different requests (for different texturing operations).

The indication of which components are stored in which cache line can thus be used to check against both cache lines.

For instance, the cache lookup may involve a two-step process; first looking up all cache lines that relate to the texture data element in question, and then checking which components are stored in those cache lines.

In embodiments however, when different requests are made for different components for a single texel (texture data element), the texture cache (controller) is operable to merge the requested components together with any components of that texel (texture data element) that are already in the texture cache and allocate a new single cache line for the merged set of components for the texture data element. In that case, subsequent cache lookup requests can look up the merged cache line, and so on.

As discussed above, the texture cache should, and in an embodiment does, comprise one or more, and in an embodiment a plurality of, cache lines.

In embodiments, a plurality of groups of texture data (texels) may be stored in a (and in an embodiment in each) cache line in the texture cache. Thus, a cache line can store any suitable and desired number of groups of texture data (texels). This may depend, for example, upon the size of each cache line and the size of the data units (data words) that are used to store each group of texture data (texels).

In embodiments, an identifier (a "look-up" key) for identifying texture data stored in the texture cache is also stored in association with (and in an embodiment in) the texture cache for use to identify the texture data in the texture cache (i.e. that can be and is in an embodiment used to read texture data from the texture cache).

The identifier can be provided in any suitable and desired way. In an embodiment, the identifier is provided as a tag for the cache line in question (in which the texture data is stored).

As mentioned above, in the technology described herein, an indication of which components are stored in the cache line (e.g., the format (the texture data format) used for the texture data in the cache line) is also stored in association with each cache line. In an embodiment the indication is stored in the same way as the identifier of the texture data, e.g. as different parts (fields) of the tag for the cache line in question (in which the texture data is stored).

In an embodiment, the texture data that is stored in the texture cache is identified (tagged) using an identifier that is indicative of a position in the graphics texture (that the cached texture data comes from) (in contrast to, e.g., using a memory address where the data is stored).

In an embodiment, the (and each) identifier used for identifying the texture data in the texture cache is indicative of a position in the texture. In an embodiment, each cache line of texture data in the texture cache is identified (is tagged) using a position in the texture of at least some of the texture data that is stored in the cache line.

The position in the texture that is used as an identifier for texture data in the texture cache can be any suitable and desired position in the texture. In an embodiment, the identifier is indicative of the position in the graphics texture of a texel or set of plural texels of the texture.

The position need not be the position of the group of texture data (texel) in question (and, indeed, in an embodiment typically will not be, as will be discussed further below), but should be a position from which the position of the group of texture data (texel) in question in the texture can be determined.

In an embodiment, the identifier is indicative of a region within the texture (that the texel (group of texture data) falls within (belongs to)).

Other arrangements would, of course, be possible for identifying the texture data that is stored within a cache line For example, the identifier (tag) for a cache line could (and in an embodiment does) indicate the position of one (e.g. the first) of the texture data groups (texels) stored in the cache line, and/or of a data element of one (e.g. the first) of the texture data groups (texels) stored in the cache line. For example, in the case of a YUV texture the identifier for a cache line may indicate the position of the chroma data element in a, e.g. the first, texture data group (texel) stored in the cache line.

The identifier indicative of position in the texture can be configured in any suitable and desired form. Thus it could, for example, comprise an "absolute" position in the texture. However, in an embodiment, the identifier indicates the position as a position index, e.g., and in an embodiment, as discussed above by indicating the (relative) position index (coordinates) (x and y indices) of the set of texels stored in the cache line. Alternatively, the identifier may indicate the position as a position index, e.g., and in an embodiment, by indicating the index of the texel in question that the position corresponds to.

The effect of this then is that the texture data in the texture cache can be accessed in (and requested from) the texture cache for use directly based on the texture position that is required (rather than, e.g., having to convert that position to appropriate memory addresses where the texture data may be stored).

Thus, in an embodiment, a (and each) cache line in the texture cache is associated with (tagged with) an indication of the position within the texture of the texture data that is stored in the cache line. The position could, as discussed above, simply comprise a 2D position (x, y coordinate), but it could also where appropriate include a vertical position (z coordinate), e.g. in the case of a three-dimensional texture. This position data is in an embodiment in the form of a position index, and in an embodiment comprises at least an (x, y) position (index), but may also comprise a z position (index) (such that the cache line will be tagged with the x, y, z position of the texture data that is stored in the cache line). (A z position (index) may be used for 3D textures (volume textures), for example (and, e.g., assumed to be zero (0) in the case of a 2D texture).)

In an embodiment as well as being associated with (tagged with) a position for the texture data that is stored in the cache line, and an indication of which component values are stored in the cache line, a (and each) cache line in the texture cache also has associated with it (is tagged with) further information relating to the texture data that is stored in the cache line, and in particular, information that further facilitates identifying and/or using the texture data that is stored in the cache line.

In an embodiment, a (and each) cache line in the texture cache also has associated with it (is tagged with) one or more of, and in an embodiment all of, the following information:

- an indication of which surface of the texture the data in the cache line belongs to;
- an indication of the layout of the texels for which the texture data is stored in the cache line (e.g. whether they are in a linear or Morton order, etc.).

The texture data can be fetched from the memory where it is stored and loaded into the cache system of the technology described herein in any suitable and desired manner (e.g. that is compatible with the overall memory and cache operation of the overall data processing system).

Thus, in an embodiment, the technology described herein further comprises (and the graphics processing system is further configured to) fetching texture data from the memory and storing it in the cache system in the required manner.

In order to fetch the data into the cache system, the graphics processing system will need to send appropriate memory requests to the memory (memory system) for the texture data. These requests may be, and are in an embodiment, triggered by the graphics processor attempting to read texture data from the cache system, or checking whether required texture data is stored in the cache system, and then finding that that texture data is not present in the cache system (i.e. encountering a cache miss). A request is in an embodiment then sent to the memory system to fetch the "missing" data, and in an embodiment to fetch plural groups of texture data (e.g. corresponding to a region of the texture) (e.g. for, or sufficient to fill, a cache line) that includes the desired "missing" texture data.

Thus, in an embodiment the graphics processor (and in an embodiment the texture mapper of the processor) is operable to request texture data by sending a texture data request to the cache system, with the cache system then operating in response to such a request to fetch the required data (if it's not already present in the cache system) from the memory system.

In an embodiment, the graphics processor (and in an embodiment the texture mapper of the graphics processor) is operable to (and operates to) request texture data by sending a texture data request to the texture cache of the cache system (with the cache system then operating in response to such a request to either return the texture data to the graphics processor (e.g. the texture mapper), or to fetch the required data into the texture cache of the cache system (if it's not already present in the texture cache of the cache system).

In an embodiment, the graphics processing unit (e.g. texture mapper) addresses the texture cache for the texture data using the appropriate texture position (as the texture data is identified in the texture cache using a texture position), as well as the appropriate set of one or more components that are presently required by the graphics processor. That is, rather than simply looking up the texture data element in full, the cache lookup request also looks up a specific (sub) set of one or more components of the texture data element.

In an embodiment, where the cache system includes first and second caches, as described above, in the case where it is determined that the required texture data is not stored in the second (texel) cache, it is first then determined whether the required texture data is stored in the first cache. In the event that the texture data is stored in the first cache, the texture data is in an embodiment transferred from the first cache to the second cache (e.g., and in an embodiment, by the data processing unit).

On the other hand, if the texture data is not found to be present in the first cache, then a request is in an embodiment sent to the memory system in order to fetch the data from the memory and store that data into, in an embodiment, the first cache (although, as will be discussed further below, it is envisaged that texture data may be stored directly into the second cache from the memory bypassing the first cache). Thus, if the texture data is not already stored in the first cache of the cache system, then appropriate memory requests are in an embodiment sent to the memory system to fetch that data into the first cache.

In the case where the texture data is being sought from the first cache (or is needed to be loaded from the memory system), then in an embodiment, that texture data request uses and addresses the first cache (or the memory) using the appropriate memory address where the texture data for the texture position will be stored in memory (as the texture data is in an embodiment identified in the first cache using a memory address).

Thus, when fetching the data from the first cache, or from memory into the first cache, the texture position that is used to address the second cache is in an embodiment converted to the appropriate memory addresses where the texture data for that texture position is stored in memory.

Any suitable cache "filling" arrangement can be used to select the cache line or lines into which fetched texture data is stored, such as a least recently used cache line replacement arrangement, etc.

In an embodiment, a cache line is (only) indicated as being "valid" (i.e. that all of the requested texture data is stored in the cache line and therefore available for use) once all of the memory requests for the cache line have been returned. For example, the number of memory requests sent and returned may be tracked and/or recorded in order to determine when all of the memory requests have been returned. In an embodiment, this comprises using a reference count corresponding to the number of memory requests needed to fill the cache line.

Although the technology described herein has been described above with particular reference to the loading of compressed texture data from the memory system, and subsequent decompression of the texture data into an uncompressed form in which it is stored in the texture cache, in embodiments it may also be the case that the texture data is stored in the memory system in the form that it is desired to be used and needed for use by the graphics processing unit, such that intermediate decompression of the texture data is accordingly unnecessary.

In this case therefore the texture data may be loaded directly into the texture cache from memory, but with potentially only some of the component values being stored, as explained above.

Once the texture data has been stored in the texture cache (in a cache line of the texture cache), it may be, and is in an embodiment, read from the texture cache (a cache line of the texture cache) for use in a texturing operation, e.g. for rendering a render output, such as an image to be displayed.

The texture data that is required will typically, and is in an embodiment, indicated by indicating a position in the texture that is to be sampled (for which the texture data is required), as well as a set of components for the texture data element in question.

Correspondingly, in an embodiment, the graphics processing unit (e.g. the texture mapper of the graphics processor) addresses the texture cache using both a position for the texture that is indicative of the texture data that is required and a set of components for the texture data element.

The texture that is being used in the technology described herein may be any suitable and desired graphics texture.

The technology described herein can be used irrespective of the format of the texture data that is being used. Thus it can, for example, be used for both RGB (or RGBA) and YUV (and YUVA) texture data, as desired. In the case of a YUV texture, the YUV texture may be configured according to any desired and suitable chroma sub-sampling mode.

The technology described herein can also be used with other texture formats, such as with textures that are used for depth and/or stencil data (values), and where graphics textures and texture processing are being used to store and process other forms of data (not just colours and images), if desired.

The technology described herein can correspondingly be used for any form of output that a graphics processing system may be used to generate. In an embodiment it is used when a graphics processing system is being used to generate images for display, but it can be used for any other form of graphics processing output, such as graphics textures in a render-to-texture operation, etc., that a graphics processing system may produce, as desired.

As will be appreciated from the above, the technology described herein is in an embodiment implemented in a system comprising a memory system, a cache system, and a graphics processing unit (GPU) (a graphics processor). Texture data for a render output (e.g. image to be displayed) is in an embodiment stored in a memory of the memory system. The GPU is in an embodiment arranged to fetch required texture data from the memory and to store it in the cache system, in the manner described above. The GPU then in an embodiment reads required texture data from the cache system for generating the render output (e.g. in the manner described above). The render output, once generated in this way, is then in an embodiment displayed, e.g. on a display such as a digital television, computer screen or the like.

The graphics processing unit (graphics processor) will, and in an embodiment does, implement and execute a graphics processing pipeline to perform graphics processing.

In an embodiment, the graphics processing system includes a host processor that executes applications that can require graphics processing by the graphics processing unit. The system in an embodiment further includes appropriate storage (e.g. memory), caches, etc.

The technology described herein can be used in and with any suitable and desired graphics processing system and processor.

The technology described herein is particularly suitable for use with tiled renderers (tile-based graphics processing systems). Thus, in an embodiment, the graphics processor (processing pipeline) is a tiled-based graphics processor (processing pipeline).

The graphics processing unit (processor) (processing pipeline) can include, and in an embodiment does include, any one or more, and in an embodiment all, of the processing stages that a graphics processor (processing pipeline) can normally include. Thus, for example, the graphics processing unit in an embodiment includes a primitive setup stage, a rasteriser and a renderer. In an embodiment the renderer is in the form of or includes a programmable fragment shader (a shader core).

The graphics processor (processing pipeline) in an embodiment also comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

The graphics processing system and/or processor in an embodiment also comprises, and/or is in communication with, one or more memories and/or memory devices that store the data described herein, and/or that store software for performing the processes described herein. The graphics processing system and/or processor may also be in communication with a host microprocessor, and/or with a display for displaying images based on the data generated by the graphics processor (processing pipeline).

The texture cache in embodiments is provided as part of the graphics processor, e.g. as part of the same system-on-chip.

The technology described herein also extends to the operation of a graphics processor itself including a texture cache that is operated in the manner described above.

Thus, a further embodiment of the technology described herein comprises a graphics processor that is operable to generate a render output, wherein when generating a render output the graphics processor is configured to perform texturing operations that apply texture data to respective sampling positions within the render output, the graphics processor comprising:

a "texture" cache operable to transfer texture data stored in memory to the graphics processor for use by the graphics processor when generating a render output, wherein texture data that is to be transferred from the memory to the texture cache can comprise multicomponent texture data, each multicomponent texture data element comprising a set of plural, respective component values for the texture data element, and the graphics processor is operable to store within a cache line of the texture cache a subset of less than all of the component values for a multicomponent texture data element, the texture cache being configured to further store in association with each cache line an indication of which texture data element component values are stored in the cache line;

the graphics processor being configured such that:

when the graphics processor requires component values for a set of one or more components of a multicomponent texture data element, the graphics processor is configured to issue a lookup request for the set of one or more component values for the texture data element to the texture cache, the lookup request using the stored indications of which texture data element component values are stored in which cache lines to determine whether the requested set of one or more component values for the texture data element are present in the texture cache:

wherein when it is determined using the stored indications that the requested set of one or more component values for the texture data element is present in the texture cache (a texture cache "hit"), the requested set of one or more component values are provided to the graphics processor from the texture cache.

According to a further embodiment, there is provided a method of operating a graphics processor that is operable to generate a render output, wherein when generating a render output the graphics processor is configured to perform texturing operations that apply texture data to respective sampling positions within the render output; the graphics processor comprising:

a "texture" cache operable to transfer texture data stored in memory to the graphics processor for use by the graphics processor when generating a render output, wherein texture data that is to be transferred from the memory to the texture cache can comprise multicomponent texture data, each multicomponent texture data element comprising a set of plural, respective component values for the texture data element, and the graphics processor is operable to store within a cache line of the texture cache a subset of less than all of the component values for a multicomponent texture data element, the texture cache being configured to further store in association with each cache line an indication of which texture data element component values are stored in the cache line;

the method comprising, when the graphics processor requires component values for a set of one or more components of a texture data element:

the graphics processor issuing a lookup request for the set of one or more component values for the texture data element to the texture cache;

using the stored indications of which texture data element component values are stored in which cache lines to determine whether the requested set of one or more component values for the texture data element are present in the texture cache; and when it is determined using the stored indications that the requested set of one or more component values for the texture data element is present in the texture cache (a texture cache "hit"), providing the requested set of one or more component values to the graphics processor from the texture cache.

The graphics processor (and method) in these further embodiments may, and in an embodiment does, comprise any or all of the optional features described above in relation to the other embodiments of the technology described herein.

Thus, in an embodiment, when it is determined using the stored indications that the requested set of one or more component values for the texture data element is not present in the texture cache (a texture cache "miss"), one or more component values for the texture data element are read into the texture cache from memory so that the lookup request can be completed.

In an embodiment, the various functions of the technology described herein are carried out on a single graphics processing platform that generates and outputs the rendered fragment data that is, e.g., written to the frame buffer for the display device. Other arrangements would of course be possible.

It will be appreciated from the above that the technology described herein may find particular utility in the context of storing texture data in a graphics processing system. Various embodiments have therefore been described so far in that context.

However, the present Applicants further recognise that there may be other situations where multicomponent data may be fetched into a cache, but wherein less than all of the component values may presently be required for a given data processing system. In that case, the technology described herein may also beneficially be used to increase cache utilisation, in a similar manner as described above for the specific situation of a texture cache.

For image, in the context of a graphics processing system, there may be various other cache systems via which image data is loaded in for a graphics processing operation. An example of this might be the graphics processor's load/store cache. A graphics processor may thus perform load/store operations in which multicomponent (e.g. multicolour) image data is loaded in via the load/store cache. Further, it may be the case that a given load/store operation may require less than all components of the multicomponent data.

The technology described herein may therefore also find utility for other, non-texturing graphics processing operations.

The technology described herein may also be applied to other types of data processing systems and is not limited to graphics processing systems. For instance, another example of where the technology described herein may apply might be a camera (image) signal processor, which may perform some processing steps using only some (less than all) of the image component (colour) channels.

Accordingly, the technology described herein in further broad embodiments also generally extends to any suitable such data processing system that can be operated in a similar manner as described above, as well as corresponding methods of operating the same.

These further broad embodiments also extend to the operation of the data processor itself.

Another embodiment of the technology described herein therefore comprises a data processor that is operable to perform data processing operations, wherein when performing a data processing operation the data processor is configured to perform processing operations using data of a first type, the data processor comprising:

a cache operable to transfer data of the first type stored in memory to the graphics processor for use by the data processor when performing a data processing operation using data of the first type, wherein data that is to be transferred from the memory to the cache can comprise multicomponent data, each multicomponent data element comprising a set of plural, respective component values for the data element, and the data processing system is operable to store within a cache line of the cache a subset of less than all of the component values for a multicomponent data element, the cache being configured to further store in association with each cache line an indication of which data element component values are stored in the cache line;

the data processor being configured such that:

when the data processor requires component values for a set of one or more components of a multicomponent data element of the first type, the data processor is configured to issue a lookup request for the set of one or more component values for the data element to the cache, the lookup request using the stored indications of which data element component values are stored in which cache lines to determine whether the requested set of one or more component values for the data element are present in the cache:

wherein when it is determined using the stored indications that the requested set of one or more component values for the data element is present in the cache, the requested set of one or more component values are provided to the data processor from the cache.

Another embodiment of the technology described herein comprises a method of operating a data processor that is operable to perform data processing operations, wherein when performing a data processing operation the data processor is configured to use data of a first type;

the data processor comprising:

a cache operable to transfer data of the first type that is stored in memory to the data processor for use by the data processor when performing a data processing operation using data of the first type, wherein data of the first type that is to be transferred from the memory to the cache can comprise multicomponent data, each multicomponent data element comprising a set of plural, respective component values for the data element, and the data processor is operable to store within a cache line of the cache a subset of less than all of the component values for a multicomponent data element, the cache being configured to further store in association with each cache line an indication of which data element component values are stored in the cache line;

the method comprising, when the data processor requires component values for a set of one or more components of a data element of the first type:

the data processor issuing a lookup request for the set of one or more component values for the data element to the cache;

using the stored indications of which data element component values are stored in which cache lines to determine whether the requested set of one or more component values for the data element are present in the cache; and when it is determined using the stored indications that the requested set of one or more component values for the data element is present in the cache, providing the requested set of one or more component values to the data processor from the cache.

The technology described herein according to these further broad embodiments may have any and all optional features described in relation to the earlier embodiments to the extent they are not mutually exclusive.

For instance, any of the steps discussed above in relation to storing multicomponent texture data in a texture cache of a graphics processing system may similarly be applied in the context of storing other multicomponent data in a cache of another data processing system. For example, in embodiments, when it is determined using the stored indications that the requested set of one or more component values for the data element is not present in the cache, one or more component values for the data element are read into the cache from memory so that the lookup request can be completed, e.g. in the manner described above.

Thus, any reference in the above to texturing operation, (multicomponent) texture data, texture data elements, a texture (or texel) cache, etc., may in embodiments be replaced with references to other suitable data processing operations, (multicomponent) data, data elements, caches, etc., as appropriate. Thus, the data processing in these further embodiments may comprise processing any suitable data, as desired. In some embodiments the data may still be image or graphics data, with multiple colour components, e.g. image data for a graphics processing load/store operation, or image data to be processed by a camera (image) signal processor. However, it also contemplated that the technology described herein may be applied to other, non-image data, in which case the multiple components may be any suitable components, e.g. depending on the nature of the data (processing) in question. Various arrangements would be possible in that regard.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements, and stages, of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display. However, it will be appreciated that graphics processors may also generally be used for processing other, e.g. non-graphics, data (for example, for general-purpose computing on graphics processing units) and that the technology described herein may therefore also be applied to other contexts as well.

FIG. 1 shows an exemplary data processing system in which the technology described herein and the present embodiment may be implemented.

The exemplary data processing system shown in FIG. 1 comprises a host processor comprising a central processing unit (CPU) 57, a graphics processing unit (GPU) 10, a video codec 51, a display controller 55, and a memory controller 58. As shown in FIG. 1, these units communicate via an interconnect 59 and have access to an off-chip memory system (memory) 20. In this system the GPU 10, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processing unit 10 that is executing on the CPU 57. The driver 61 will then generate appropriate commands and data to cause the graphics processing unit 10 to render appropriate frames for display and to store those frames in appropriate frame buffers, e.g. in the main memory 20. The display controller 55 will then read those frames into a buffer for the display from where they are then read out and displayed on the display panel of the display 54.

The present embodiments and the technology described herein relate in particular to the situation where the graphics processing unit 10 is using a texture when rendering a frame for output (e.g. for display). Such textures will comprise arrays of data elements (texture elements (texels)), each having an associated data value or values in the data format of the texture in question.

The textures will typically comprise images that are to be applied to graphics entities, such as primitives, to be rendered, and will normally be stored in the off-chip memory 20 from where they can then be read in by the GPU 10 when required. In particular, when using a texture to generate a render output, the GPU 10 will fetch the texture data from the memory 20 and store it in a local, texel cache of the GPU 10. The texture data will then be read from the texel cache, when needed, and used to generate the render output, e.g. frame for display.

Figure 2:
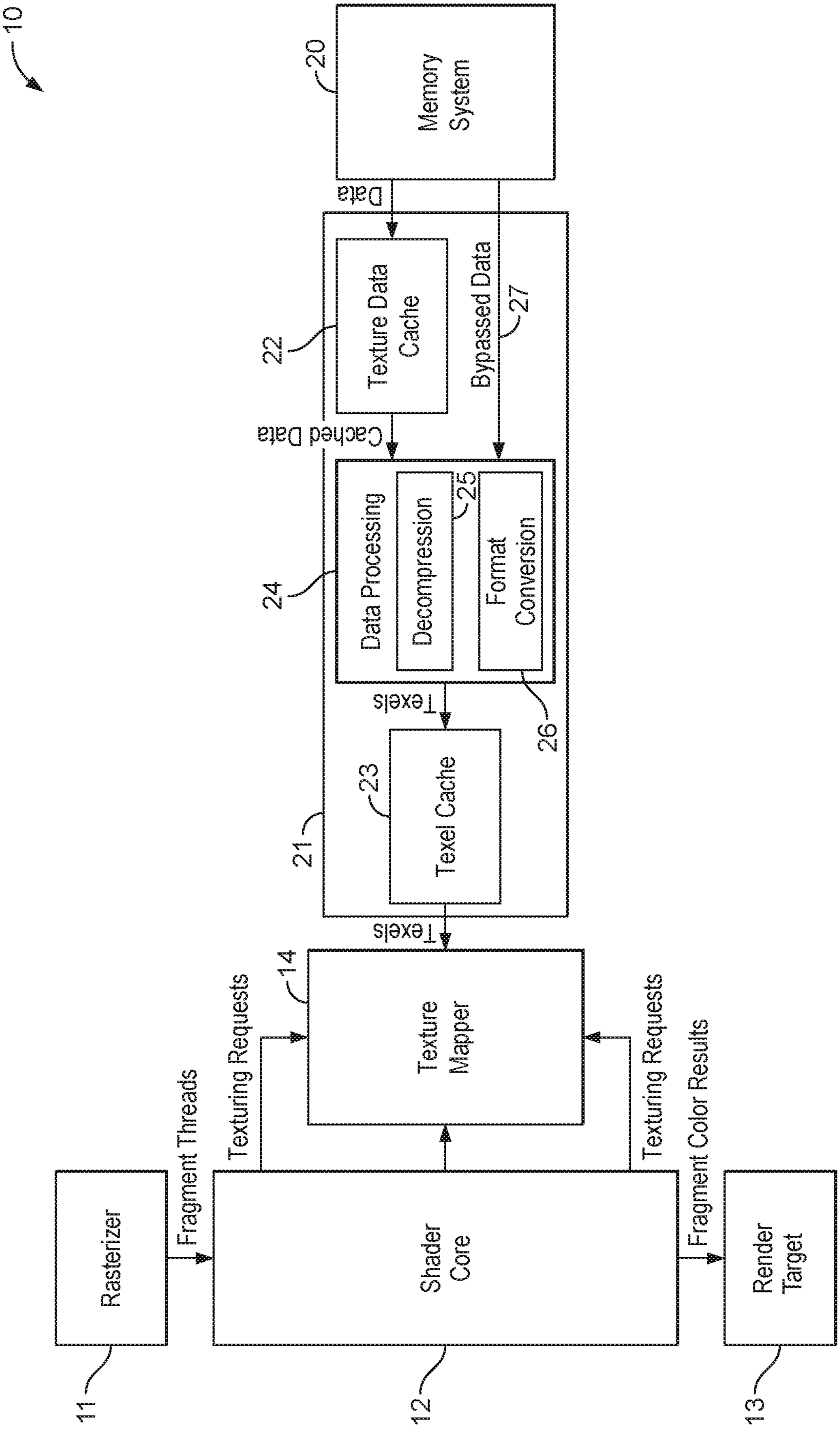
FIG. 2 shows schematically an embodiment of the technology described herein wherein the texture cache system includes a first (texture data) cache and a second (texel) cache.
Figure 3:
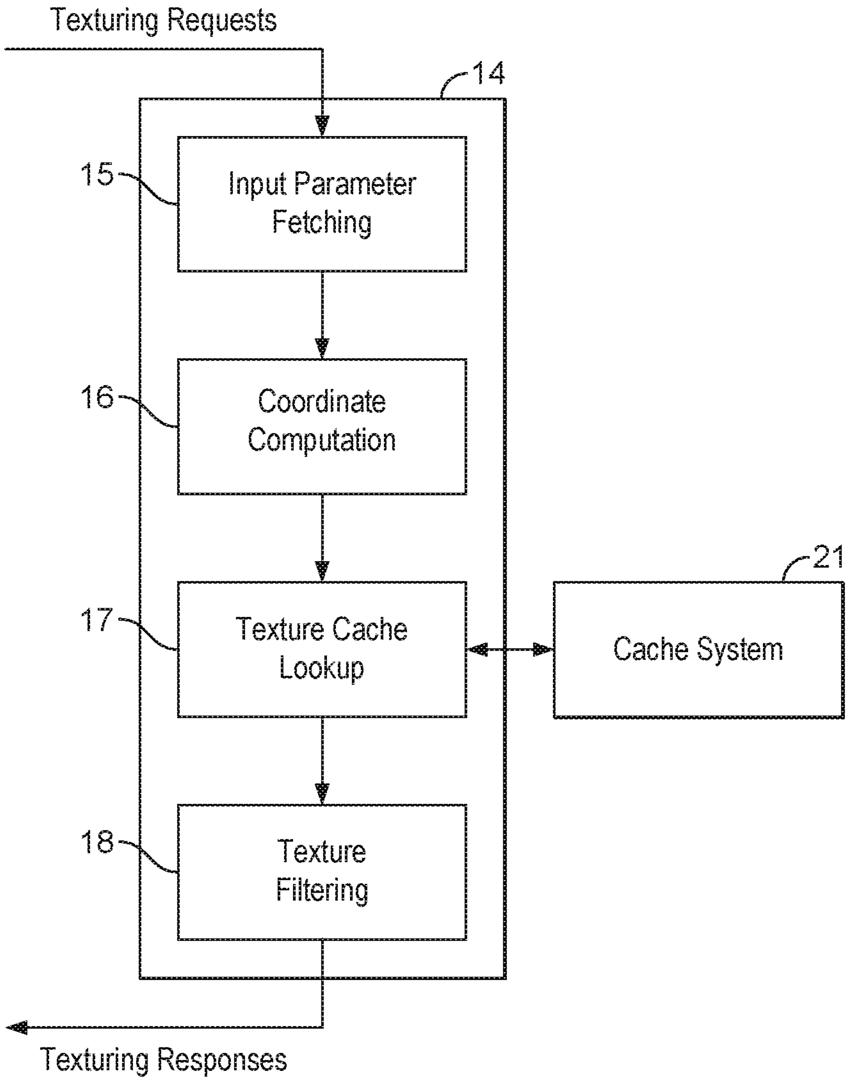
FIG. 3 shows the texture mapper of the graphics processing system of FIG. 2 in more detail.

FIGS. 2 and 3 shows schematically the elements of the graphics processing unit 10 of the system shown in FIG. 1 that are relevant to the operation of the present embodiments. As will be appreciated by those skilled in the art, there may be other elements of the graphics processing unit 10 that are not illustrated in FIGS. 2 and 3.

In the present embodiment, the GPU 10 is a tile-based graphics processor. However, other arrangements are, of course, possible.

As shown in FIG. 2, the graphics processing unit 10 implements a graphics processing pipeline that includes, inter alia, a rasterizer 11, a renderer in the form of a (programmable) shader core 1, a buffer 13 (e.g. in memory 20) for storing the output render target (e.g. frame to be displayed), and a texture mapper 14, and is in communication with the memory system 20.

The system memory 20 will store, inter alia, graphics textures to be used by the GPU 10. The system memory 20 may, e.g., be a disk drive or other storage medium (e.g. a hard disk, a RAID array of hard disks or a solid state disk) of or accessible to the host system in which the graphics processing unit 10 is located, and may be an internal storage medium of the host system, or an external or removable storage medium.

As shown in FIG. 3, the texture mapper 14 may comprise, for example, an input parameter fetching unit 15, a coordinate computation unit 16, a texel cache lookup unit 17, and a texture filtering unit 18.

As shown in FIG. 2, the texture mapper 14 interfaces with the memory system 20 via a texel cache system 21. The texel cache system 21, as shown in FIG. 2, contains a first cache 22 (a "texture data" cache) that receives data from the system memory 20, and a second cache 23 (a "texel" cache) that interfaces with the texture mapper 14 and from which the texture mapper 14 may read data of texels required for its texturing operations. The texel cache system 21 also includes a data processing unit 24 that is operable to read data from the first, texture data cache 22, process that texture data, and then provide that data to the second, texel cache 23.

The operation of the texel cache system 21 in the present embodiments will be discussed in more detail below.

The first 22 and second 23 caches of the texel cache system 21 are local memory for storing texture data, and may, e.g., comprise a RAM. They may be in the form of an SRAM memory. They each comprise a plurality of cache-lines. In the present embodiment, the second cache 23 of the cache system 21 has a greater capacity than the first cache 22, such as having twice or four times as many cache lines as the first cache.

Other arrangements would, of course, be possible.

The arrows in FIGS. 2 and 3 indicate the main ways in which data flows between the various components of the graphics processing pipeline and the memory 20. There may also be other communication routes or directions that are not indicated.

The rasterizer 11 receives as its input primitives (e.g. triangles) to be used to generate a render output, such as a frame to be displayed, and rasterizes those primitives into individual graphics fragments for processing. To do this, the rasterizer 11 rasterizes the primitives to sample points representing the render output, and generates graphics fragments representing appropriate sampling positions for rendering the primitives. The fragments generated by the rasterizer 11 are then sent onwards to the shader core (renderer) 12 for shading.

The shader core 12 executes a shader program or programs for the fragments issued by the rasterizer 11 in order to render (shade) the fragments. The shader programs may have no, one, or more, texturing instructions (texturing operations) that are required to be executed by the texture mapper 14. When a texturing instruction is encountered by the shader core 12, a texturing message is sent from the shader core 12 to the texture mapper 14, instructing the texture mapper 14 to follow one or more texturing instructions. After the texture mapper 14 has finished its texture processing (carrying out these instructions), the final result is sent back to the shader core 12 in a response message for use when shading the fragment in question.

The texture mapper 14 includes suitable processing circuitry to perform texturing instructions. This processing circuitry may, e.g., be in the form of a dedicated hardware element that is configured appropriately, or it may, e.g., comprise programmable processing circuitry that has been programmed appropriately. In an embodiment, a dedicated hardware texture mapper is used.

The "shaded" fragment from the shader core 12 is then stored as part of the output render target in the buffer 13, e.g. the main memory 20, e.g. for subsequent display.

Thus, when instructed by the shader core 12, the texture mapper 14 reads textures from the memory 20 (as required), performs various processing steps, and returns a colour sampled from the texture back to the shader core 12.

As part of this processing, the input parameter fetching unit 15 may, for example, read in the parameters of the texture to be sampled and the parameters of how to sample the texture from appropriate state information for the texture.

The coordinate computation unit 16 may, for example, receive the texturing request message from the shader core 12 containing the coordinates to sample in the texture, together with the parameters read by the input parameter fetching unit, and determine the actual texel indices in the texture to be looked up from the texel cache system 21.

The texel cache lookup unit 17 may, for example, check whether the required texture data is stored in the second (texel) cache 23 of the texel cache system 21 and, if present, read the texture data from the second (texel) cache 23. For a typical bilinear lookup, texture data from four texels are read from a 2×2 texel region of the texture.

The texture filtering unit 18 may, for example, receive the four texels of the bilinear lookup from the texel cache lookup unit, and determine interpolation weights and compute a weighted average of the texture data for the sampling position in question. This is then output to (returned to) the shader core 12.

The operation of the texel cache system 21 of the present embodiments will now be described in more detail.

In the present embodiments, the first cache 22 (the texture data cache) of the texel cache system 21 stores the texture data as a copy of the bits of the texture data as stored in the memory system 20, and each cache line of the first cache 22 is tagged with the memory address of the first byte in the cache line. Thus, each cache line of the first cache 22 will store a cache-line's amount of texture data from contiguous addresses in the main memory of the memory system 20.

The second cache 23 (the texel cache) of the texel cache system 21 stores the texture data as respective texels, in the uncompressed format in which they will be used by the graphics processing unit 10.

In the present embodiments, each texel is stored using one of a set of particular, predefined, texel data formats that are supported by the graphics processing unit 10. Examples of such formats would be, for example, R5G6B5, R4G4B4A4, R8G8B8A8, Y8U8V8A8, Y16U16V16A16, and so on (where the letter indicates the component (or data channel) and the number indicates the number of bits stored for that component). Other formats for the texture data of a texel could be used, if desired.

In particular, it will be appreciated that the example formats given above are all multicomponent formats, wherein each texel comprises a set of plural components (e.g. RGB (A) or YUV components). However, it is also possible to store, and use, texels in other narrower formats, such as R4A4, R8A8, etc., formats (and corresponding formats for other components (data channels)), where less than all of the components (data channels) are used.

In some more conventional arrangements, the texels would always be stored in the second cache 21 (the texel cache) in the same format, based on the compression format in which they are stored in the memory system 20. That is, for multicomponent (RGBA) texture data, the second cache 21 (the texel cache) would always simply store the texels in full RGBA format, with all of their components.

However, the present Applicants have recognised that this may be an inefficient use of the cache resource. For instance, it is often the case that the texturing operations performed by the graphics processor may require less than all of the components. It is also the case that some decompression schemes always decompress to multiple components even when the underlying data in fact has fewer components. The present Applicants further recognise that cache utilisation may therefore be increased by allowing less than all of the components to be stored in the second cache 23 (the texel cache), when it is appropriate to do so.

Thus, in the present embodiment, the second cache 23 (texel cache) is operable to select different formats in which texels should be stored, depending on which components are actually of interest to the present texturing operations. In particular, rather than always storing multicomponent texels in full, it is possible to store the texels in a reduced component format, i.e. such that a subset of less than all of the component values are stored in the second cache 23 (texel cache).

In this respect, it will be appreciated that which components are required is typically not known in advance, as this information may only be known at run-time. In the present embodiments, the graphics processing unit 10 when issuing a cache lookup request to the second cache 23 (texel cache) thus uses the run-time information from the sampler state in the texture cache format selection logic, as the sampler channel selection is known at the point at which a cache lookup is made.

Figure 4:
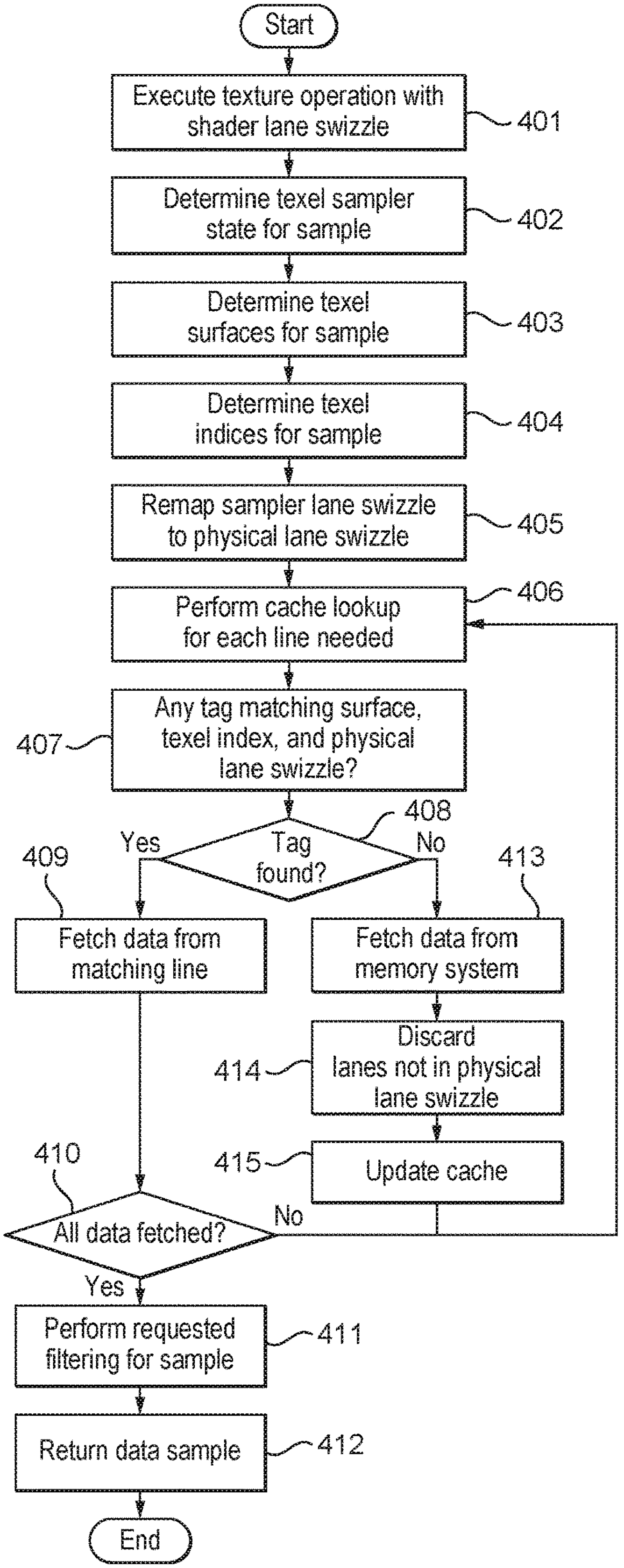
FIG. 4 is a flow chart illustrating the operation according to an embodiment of the technology described herein.

FIG. 4 is a flow chart illustrating a cache lookup operation according to the present embodiment.

In particular, FIG. 4 illustrates the situation where the graphics processor is executing a texturing operation using a shader lane swizzle (step 401). It is first determined which texel component values (the texel sampler state) are required for the texturing operation (step 402), as well as which texel surfaces are required (step 403) and the indices for the texel sample in question (step 404).

At this point, rather than simply issuing a request for the texel in full, the sampler lane swizzle (the sampling mask indicating the texel sampler state) is re-mapped onto the physical lane swizzle (step 405), and a lookup is then made to the second cache 23 (texel cache) for the requested texel component values for each line that is needed (step 406).

It is then determined, using the cache line tags, whether any of the cache lines include the required texel component values, e.g. by checking to see if there are any cache line tags that match each of the surface, texel index and physical lane swizzle for the request (step 407).

If a cache line tag does match the request (there is a cache "hit") (step 408—yes) the data is then fetched from the matching line (step 409).

On the other hand, if there is no cache line tag that matches the request (there is a cache "miss"), the missing data is then fetched from the memory system accordingly (step 413). The texel is thus fetched from its memory location and decompressed accordingly. However, rather than simply storing all of the texel component values in the second cache 23 (texel cache), any lanes (colour channels) that are not in the physical lane swizzle can be discarded at this point (step 414), with the texel being instead stored and used in a reduced component texel format (step 415).

If there is still data to be fetched (step 410—no), further cache lookups are performed (step 406), and handled in the same way. Once all of the data has been fetched (step 410—yes), the requested texturing (filtering) operation is performed for the sample (step 411), with the data sample then being returned accordingly (step 412).

Figure 5:
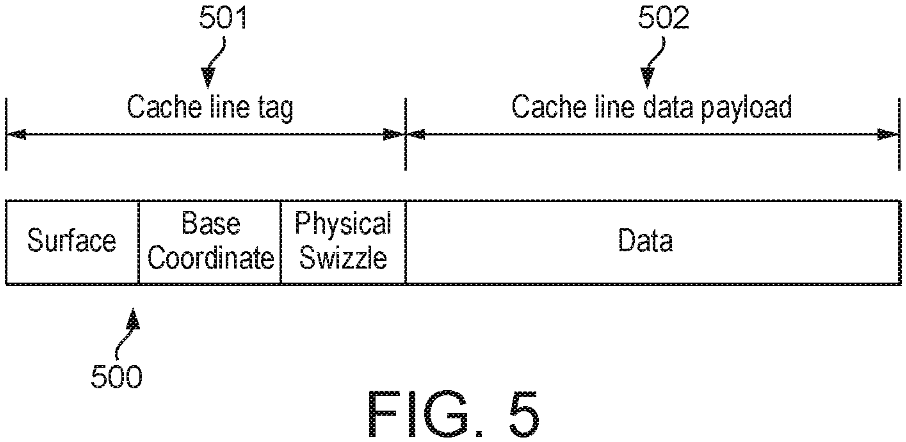
FIG. 5 shows an example of a cache line within the texel cache according to an embodiment of the technology described herein.

In order to track which component values are stored in which cache line, when a texel is fetched from memory into the second cache 23 (texel cache) (in step 413), the physical swizzle (which represents the sampler state, following the re-mapping in step 406) is included into the cache line tag, e.g. as shown in FIG. 5. This then allows subsequent cache lookup requests to check against the physical swizzle to determine whether the components of interest are stored in the cache line. FIG. 5 thus shows a single cache line 500 storing a set of payload texel data 502. The cache line tag 501 then identifies the surface and base co-ordinate for the stored texel data 502, as well as storing the physical swizzle, indicating which components are stored in the cache line 500.

Figure 6:
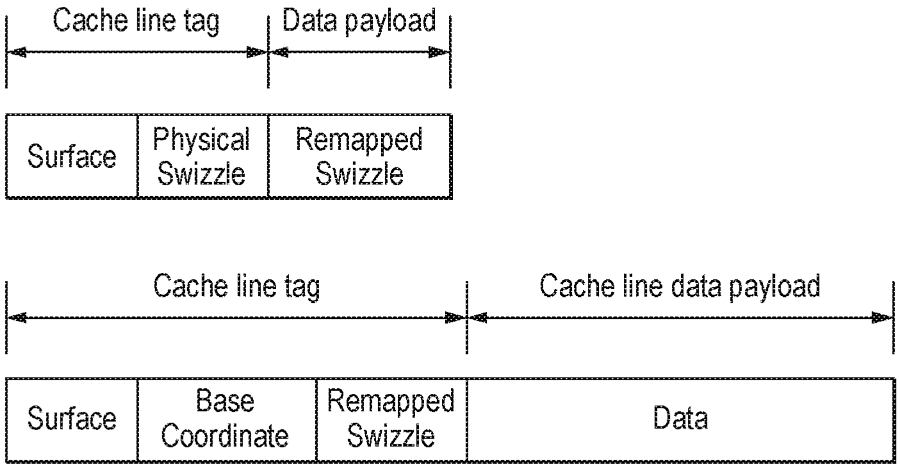
FIG. 6 shows an example of a cache line within the texel cache according to another embodiment of the technology described herein.

Other arrangements for indicating which components are stored in a cache line would however be possible. For instance, rather than storing the physical swizzle directly, as shown in FIG. 5, the cache line tag may itself be compressed such that the cache line tag stores an indirect indication of which component values are stored in which cache line. An example of this is shown in FIG. 6, where the physical swizzle is re-mapped onto one of a set of discrete values and the re-mapped value is stored in the cache line tag. A separate cache may then be used to store the mappings between the physical and re-mapped swizzles.

Various arrangements would be possible in this regard.

FIG. 7 shows an example of the texel cache arrangements according to the present embodiment.

For instance, FIG. 7A illustrates two texture surfaces (surface 0 and surface 1) being stored in the second cache 23 (texel cache). The first surface (surface 0) is stored in full RGBA colour format, at two different co-ordinates, in the first two lines of the cache. The second surface (surface 1) is however stored with different sets of lanes (different components) active at the same co-ordinate.

Thus, in this example, the third cache line stores the RG components for the second surface (surface 1) at the (0,0) co-ordinate, whereas the fourth cache line stores the RA components for the second surface (surface 1) at the (0,0) co-ordinate. The determination of which components are stored is made as described above in dependence on the required sampler state.

Storing only some of the components in the cache therefore allows a better utilisation of the cache resource. For example, if the texture-format (in memory) is actually R4G4B4A4, but it is determined that only the RA components should be stored for the present operation, then it is only necessary to store R4A4 bit values in the texture cache (and in the technology described herein this can therefore be done). In that case only half of the components are stored in the cache, which means that each cache line would potentially be able to store twice as many texels.

FIG. 7B shows another example. In this example, the initial state of the cache is shown in the uppermost figure, wherein the second surface (surface 1) is stored in the third and fourth cache lines with RG samples (only), at two different co-ordinates. At some point, the graphics processor requests a sample from the second surface (surface 1) with an RA sampler. This will cause a cache miss, as the A component value is not present in the cache, and will thus cause the RA component values to be fetched from memory. However, rather than storing only the RA component values, in this example, the fourth cache line is re-allocated for storing all of the component values, in a merged format. In particular, in this case, the values are stored in full RGBA format (since there is little benefit in storing only three (e.g. the RGA) component values, as the cache lines operate on powers of two).

Figure 8:
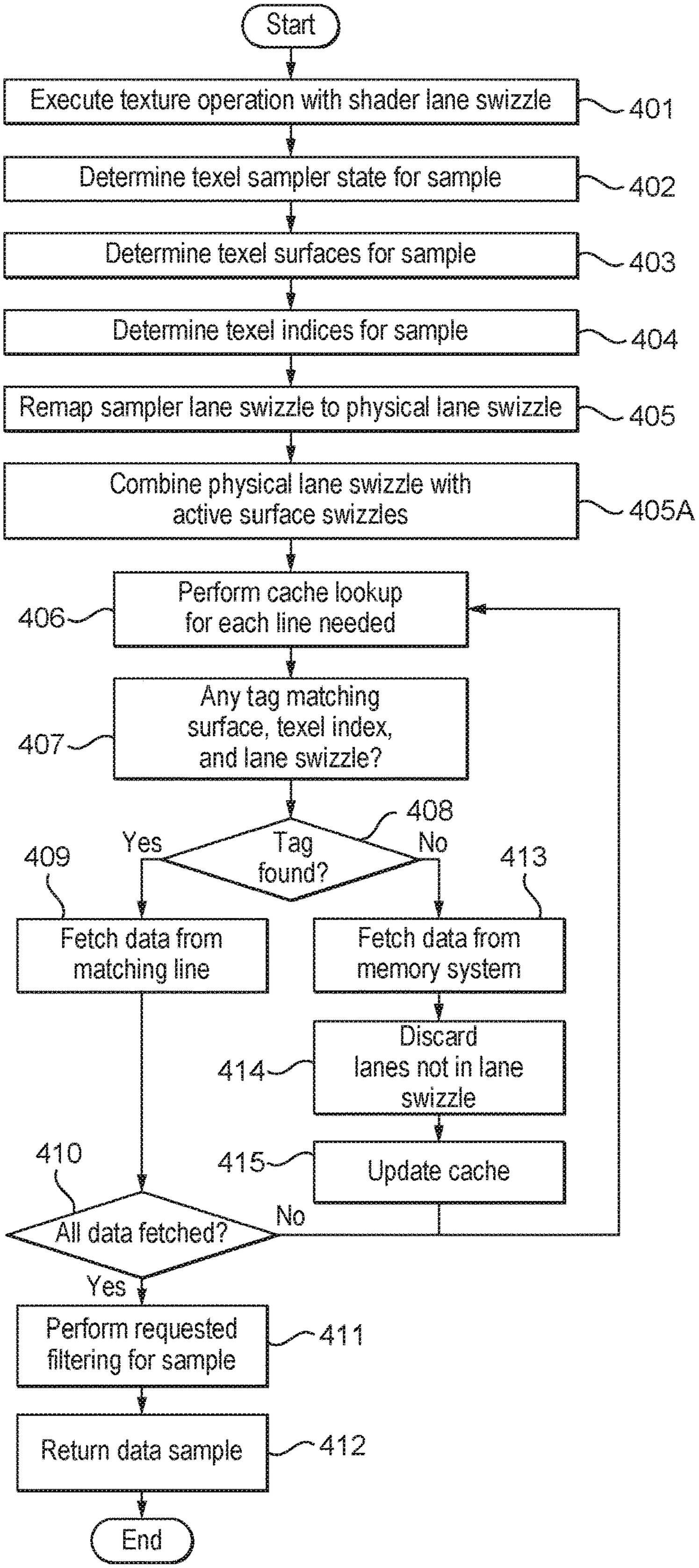
FIG. 8 is a flow chart illustrating the operation according to another embodiment of the technology described herein.

FIG. 8 is a flow chart illustrating the merging operation that is shown in FIG. 7B. The operation is essentially the same as described above in relation to FIG. 4 except in this case, after re-mapping the sampler lane swizzle to the physical lane swizzle (in step 405), the physical lane swizzle is then combined with any other active surface swizzles (step 405A). This then has the effect of merging the current request (e.g. for RA samples) with the data that is already in the texel cache (the RG samples), to cause a new cache line to be allocated for the merged set of requested/stored samples.

In this case, additional logic is provided to store all samples, rather than storing only three, as mentioned above. For instance, one way to achieve this would be to look at the merged set of components and then check how many bits per texel would be needed to store these components in the cache. For example, if the RGA components of a 16-bit per component-format are required, then 48 bits would be needed to store the RGA components. However, if the texel cache doesn't have the ability to store data in a 48-bit per texel format (e.g. because it is only able to store texels of a power-of-two number of bits), the texel would anyway have to be padded to 64-bits. In that case, it therefore may not make sense to discard the B component and pad the remaining bits, and it may be better to store all of the RGBA components (even though the B component is not presently required). Various other arrangements would be possible.

Whilst various examples are described above in relation to multicomponent texture data it will be appreciated that the technology described herein may be applied more widely to situations other than graphics processor texturing. For example, (whilst not shown in FIG. 2) a graphics processor may also comprise a load/store unit in communication with the shader core 12, that is operable, e.g., to load into an appropriate load/store cache, data, etc., to be processed by the graphics processor (shader core), and to write data back to the memory system 20 (for data loads and stores for programs executed in the programmable execution unit). The load/store unit and load/store cache may thus be used to perform load/store operations in a similar fashion to the texturing operations described above, e.g. by the shader core 12 executing a shader program including one or more load/store instructions that are required to be processed by the load/store unit. For example, the shader core 12 may cause the load/store unit to perform image load/store operations, as required. In that case, the technology described herein may be similarly applied to facilitate improved caching of such image data in the load/store cache.

More generally, the technology described herein may be used for any suitable data processing systems. For example, there are data processors other than graphics processors, such as camera (image) signal processors, that may also process image data, and in which there may be some processing steps where less than all colour channels are required (for example, a given processing step may require only the brightness colour channel, or only a particular colour (e.g. green) channel), and in which the technology described herein may therefore also be used. Thus, whilst FIG. 1 shows one example of a data processing system in which the technology described herein may be implemented, it will be appreciated that other example data processing systems exist that use other data processors to process image (and non-image) data and that may also benefit from the technology described herein.

Those skilled in the art will appreciate that there are various other examples of image and non-image multicomponent data that may need to be processed depending on the data processing in question and, in general, the technology described herein may be applied to facilitate improved caching in any situation in which the processing may require less than all components of a particular data element to be used. Various arrangements would be possible in this regard.

The foregoing detailed description has been presented for the purposes of illustration and description in the context of storing multicomponent texture data within a graphics processing system. This description is however not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A data processing system comprising:

a memory system;

a data processor operable to perform processing operations, wherein when performing at least some data processing operations the data processor is configured to use data of a first type; and a cache operable to transfer data of the first type that is stored in the memory to the data processor for use by the data processor when performing a processing operation, wherein data of the first type that is to be transferred from the memory to the cache can comprise multicolour data, each multicolour multicomponent data element comprising a set of plural, respective colour channels, and the data processing system is operable to store within a cache line of the cache a subset of less than all of the colour channels for a multicolour data element, the cache being configured to further store in association with a cache line that is storing a subset of less than all of the colour channels for a multicolour data element an indication of which colour channels from the set of plural, respective colour channels for the multicolour data element are stored in the cache line;

the data processing system being configured such that:

when the data processor requires values for a set of one or more colour channels of a multicolour data element of the first type, the data processor is configured to issue a lookup request for the set of one or more colour channels for the data element to the cache, the lookup request using the stored indications of which colour channels are stored in which cache lines to determine whether the requested set of one or more colour channels for the data element are present in the cache:

wherein when it is determined using the stored indications that the requested set of one or more colour channels for the data element is present in the cache, the requested set of one or more colour channels are provided to the data processor from the cache.

2. The data processing system of claim 1, wherein when it is determined using the stored indications that the requested set of one or more colour channels for the data element is not present in the cache, one or more colour channels for the data element are read into the cache from memory so that the lookup request can be completed.

3. The data processing system of claim 1, wherein the data processing system is configured such that the data processor, when performing a data processing operation, is operable to issue a lookup request for values for a subset of less than all colour channels of a multicolour data element of the first type, and wherein the set of colour channels that are stored within a cache line of the cache for a multicolour data element is determined in dependence on which colour channels have been requested by the data processor.

4. The data processing system of claim 3, wherein the data processor is configured to perform, during the data processing operation, a swizzle operation that identifies which colour channels are required for the data processing operation, and wherein one or more swizzle parameters are included in the cache lookup request to provide the cache with an indication of which colour channels are presently required for the data processing operation.

5. The data processing system of claim 3, wherein the cache is configured to merge the colour channels indicated in the cache lookup request with other colour channels for the same data element that are already stored in the cache and to allocate a new single cache line for the merged set of colour channels for the data element.

6. The data processing system of claim 1, wherein the indications of which colour channels are stored in which cache line are stored in respective cache line tags.

7. The data processing system of claim 6, wherein the indication comprises a set of swizzle parameters identifying a corresponding set of colour channels.

8. The data processing system of claim 6, wherein the cache is constrained to store data elements of the first type according to one of a predetermined set of multicolour data formats, and wherein the indication indicates which one of these predetermined set of multicolour data formats is used for the data in the cache line.

9. The data processing system of any preceding claim, wherein the data is stored in the memory in a compressed format, and wherein the data is stored in the cache in an uncompressed format in which it is used by the data processor when performing a data processing operation, wherein when data in the compressed format is decompressed for storage in the cache, the decompressed data comprises the multicolour data.

10. The data processing system of claim 1, wherein the data processor is a graphics processor that is operable to generate a render output, wherein when generating a render output the graphics processor is configured to perform texturing operations that apply texture data to respective sampling positions within the render output; and wherein the data of the first type is multicolour texture data including a plurality of colour channels, and wherein the cache is operable to store subsets of less than all of the colour channels of a texture data element.

11. A data processor that is operable to perform data processing operations, wherein when performing a processing operation the data processor is configured to perform data processing operations using data of a first type, the data processor comprising:

a cache operable to transfer data of the first type stored in memory to the data processor for use by the data processor when performing a data processing operation using data of the first type, wherein data that is to be transferred from the memory to the cache can comprise multicolour data, each multicolour data element comprising a set of plural, respective colour channels, and the data processing system is operable to store within a cache line of the cache a subset of less than all of the colour channels for a multicolour data element, the cache being configured to further store in association with a cache line that is storing a subset of less than all of the colour channels for a multicolour data element an indication of which colour channels from the set of plural, respective colour channels for the multicolour data element are stored in the cache line;

the data processor being configured such that:

when the data processor requires values for a set of one or more colour channels of a multicolour data element of the first type, the data processor is configured to issue a lookup request for the set of one or more colour channels for the data element to the cache, the lookup request using the stored indications of which colour channels are stored in which cache lines to determine whether the requested set of one or more colour channels for the data element are present in the cache:

wherein when it is determined using the stored indications that the requested set of one or more colour channels for the data element is present in the cache, the requested set of one or more colour channels are provided to the data processor from the cache.

12. A method of operating a data processing system that comprises:

a memory system;

a data processor operable to perform processing operations, wherein when performing at least some data processing operations the data processor is configured to use data of a first type; and a cache operable to transfer data of the first type that is stored in the memory to the data processor for use by the data processor when performing a data processing operation that uses data of the first type, wherein data of the first type that is to be transferred from the memory to the cache can comprise multicolour data, each multicolour data element comprising a set of plural, respective colour channels, and the data processing system is operable to store within a cache line of the cache a subset of less than all of the colour channels for a multicolour data element, the cache being configured to further store in association with a cache line that is storing a subset of less than all of the colour channels for a multicolour data element an indication of which colour channels from the set of plural, respective colour channels for the multicolour data element are stored in the cache line;

the method comprising, when the data processor requires values for a set of one or more colour channels of a data element of the first type:

the data processor issuing a lookup request for the set of one or more colour channels for the data element to the cache, using the stored indications of which colour channels are stored in which cache lines to determine whether the requested set of one or more colour channels for the data element are present in the cache; and when it is determined using the stored indications that the requested set of one or more colour channels for the data element is present in the cache, providing the requested set of one or more colour channels to the data processor from the cache.

13. The method of claim 12, wherein when it is determined using the stored indications that the requested set of one or more colour channels for the data element is not present in the cache, the method comprises reading one or more colour channels for the data element into the cache from memory so that the lookup request can be completed.

14. The method of claim 12, wherein the lookup request is a lookup request for values for a subset of less than all colour channels of a multicolour data element, and wherein the set of colour channels that are stored within a cache line of the cache for a multicolour data element is determined in dependence on which colour channels are requested by the data processor.

15. The method of claim 14, wherein the data processor is configured to perform, during the data processing operation, a swizzle operation that identifies which colour channels are required for the data processing operation, and wherein the method comprises including swizzle parameters in the cache lookup request to provide the cache with an indication of which colour channels are presently required for the data processing operation.

16. The method of claim 14, comprising the cache merging the colour channels indicated in the cache lookup request with other colour channels for the same data element that are already stored in the cache and allocating a new single cache line for the merged set of colour channels for the data element.

17. The method of claim 12, comprising storing the indications of which colour channels are stored in which cache line in respective cache line tags.

18. The method of claim 17, wherein the indication comprises a set of swizzle parameters identifying a corresponding set of colour channels.

19. The method of claim 17, wherein the cache is constrained to store data elements of the first type according to one of a predetermined set of multicolour data formats, and wherein the indication indicates which one of these predetermined set of multicolour data formats is used for the data in the cache line.

20. The method of claim 12, wherein the data of the first type is stored in the memory in a compressed format, and wherein the data is stored in the cache in an uncompressed format in which it is used by the graphics processor when performing a data processing operation, wherein when data in the compressed format is decompressed for storage in the cache, the decompressed data comprises the multicolour data.

* * * * *